United States Patent
Bunker

(10) Patent No.: US 6,508,338 B1
(45) Date of Patent: *Jan. 21, 2003

(54) DISC BRAKE

(75) Inventor: Kenneth James Bunker, Leicester (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/762,971

(22) PCT Filed: Jul. 28, 1999

(86) PCT No.: PCT/GB99/02477

§ 371 (c)(1),
(2), (4) Date: Feb. 14, 2001

(87) PCT Pub. No.: WO00/09900

PCT Pub. Date: Feb. 24, 2000

(30) Foreign Application Priority Data

Aug. 15, 1998 (GB) .............................................. 9817747

(51) Int. Cl.[7] .............................................. F16D 55/08
(52) U.S. Cl. ................ 188/72.1; 188/73.42; 188/73.45
(58) Field of Search ............................... 188/72.1, 71.5, 188/72.4, 73.1, 73.41, 73.42, 73.43, 73.44, 73.45

(56) References Cited

U.S. PATENT DOCUMENTS 3,146,860 A * 9/1964 Wilson ...................... 188/72.1
6,131,932 A * 10/2000 Bunker ................ 280/124.146
6,223,863 B1 * 5/2001 Bunker ...................... 188/18 A
6,244,391 B1 * 6/2001 Bunker ........................ 188/141
6,247,560 B1 * 6/2001 Bunker ...................... 188/18 A
6,298,953 B1 * 10/2001 Bunker ...................... 188/71.1
6,305,510 B1 * 10/2001 Bunker ................. 188/218 XL

FOREIGN PATENT DOCUMENTS

| DE | 3042601 | 6/1982 |
| EP | 054 779 | 6/1982 |
| GB | 1530461 | 11/1978 |
| WO | WO 98/25804 | 6/1998 |

* cited by examiner

Primary Examiner—Pam Rodriguez
(74) Attorney, Agent, or Firm—Scott A. McBain

(57) ABSTRACT

A disc brake (10) comprises a disc (12, 14), friction material pads (26) arranged on opposite sides of the disc, and an operating mechanism (50, 52) operable to bring the pads into contact with the disc so that the pads apply a braking force to the disc. The brake (10) also comprises a slideway (72a) on which at least one of the pads (26) is suported for sliding movement towards or away from the disc (12, 14). The slideway (72a) is formed by a guidance member (72) which defines at least two parallel grooves (72b) in a surface (72c) of the guidance member. The grooves (72b) extend parallel to the direction of the slideway (72a). The guidance member (72) is supported by parallel rods (70) which are received in the grooves (72b).

5 Claims, 2 Drawing Sheets

DISC BRAKE

BACKGROUND OF THE INVENTION

1. Technical Field

Figure 1:
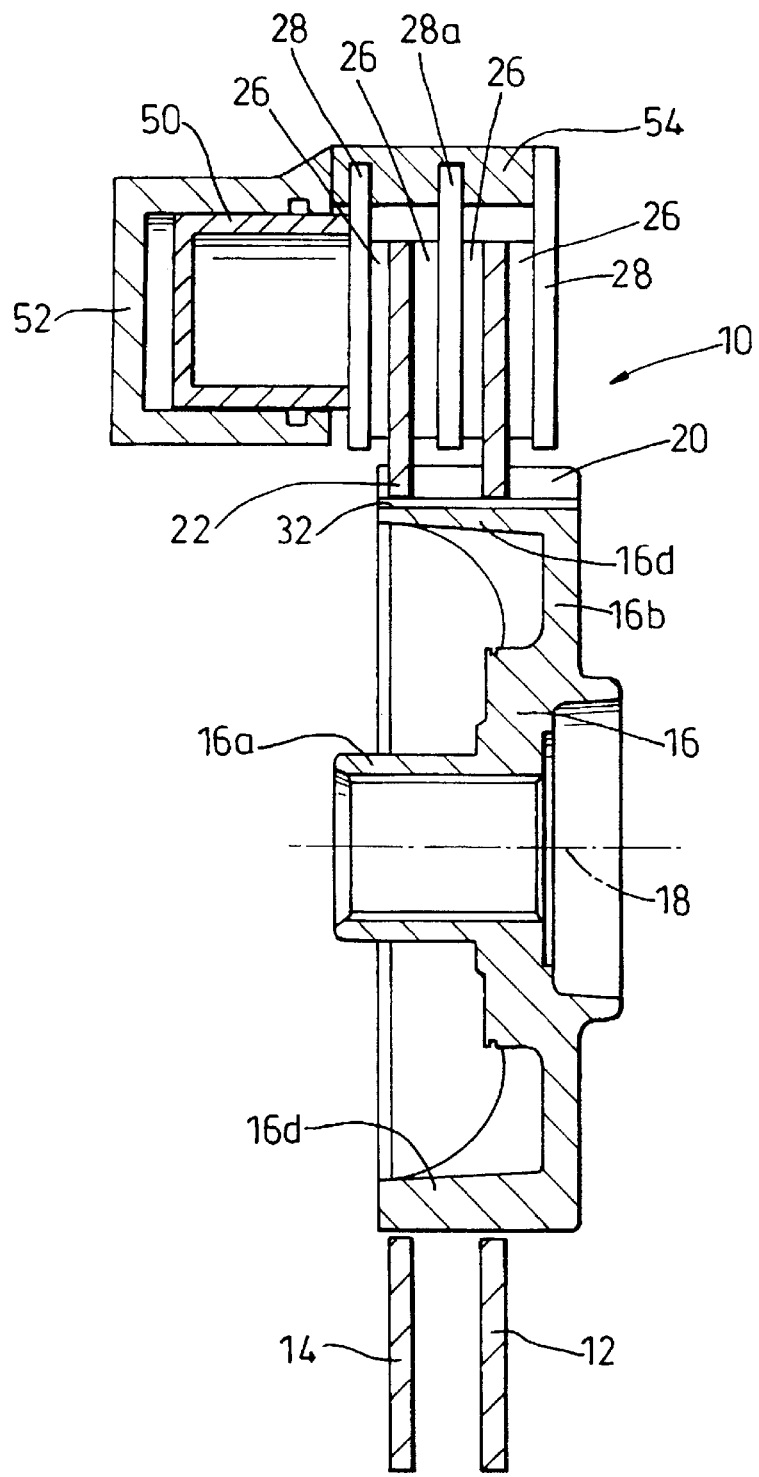

This invention is concerned with a disc brake, eg for the wheel of a vehicle.

2. Related Art

In WO 98/25804, there is disclosed a disc brake which comprises two discs mounted on the same hub to rotate with the hub about a central axis of the hub, and friction material pads arranged on opposite sides of both discs including two pads between the discs. The discs are slidable axially on the hub and the pads are slidable in a parallel direction except for one pad which is fixed relative to the hub. Said disc brake also comprises an operating mechanism operable to bring the pads into contact with the discs to apply a braking force thereto. The brake also comprises a slideway on which at least one of said pads is supported for sliding movement towards or away from the disc. The slideway comprises a guidance member on which the movable pads are slidably-supported, ie the guidance member provides a slideway on which pads are supported for movement towards or away from said discs. The operating mechanism, which comprises a hydraulically-operated piston and cylinder assembly, the cylinder of which is fixed on a suspension link. The operating mechanism operates to move a first of the pads on the slideway into contact with a first of the discs, causing movement of the first disc on the hub to bring the other pad associated with that disc into contact with the first disc. The movement continues moving the pads which are between the discs so that one of them contacts the second disc which moves into contact with the other pad associated with the second disc which is the pad which is fixed relative to the hub. The guidance member is supported by bolts which pass therethough and fix it to said cylinder. As further explained in WO 98/26191, the bolts enable the bending and shearing forces applied to the pads during operation of the brake to be taken by the bolts while the guidance member itself can be made from lower strength material. The slideway is relatively complex to assemble and requires relatively long holes to be drilled through the guidance member to receive said bolts.

It is an object of the present invention to provide a disc brake having a simplified slideway which is easier to assemble.

SUMMARY OF THE INVENTION

The invention provides a disc brake comprising a disc, friction material pads arranged on opposite sides of the disc, and an operating mechanism operable to bring the pads into contact with the disc so that the pads apply a braking force to the disc, the brake also comprising a slideway on which at least one of said pads is supported for sliding movement towards or away from the disc, characterised in that said slideway is formed by a guidance member which defines at least two parallel grooves in a surface of the guidance member, the grooves extending parallel to the direction of the slideway, the guidance member being supported by parallel rods which are received in said grooves.

In a disc brake according to the invention, the grooves in the guidance member are much easier to form than long holes through the guidance member and, in assembling the brake, the guidance member can simply be fitted over the rods.

A disc brake according to the invention may be of the type disclosed in WO 98/25804. That brake comprises two discs which are slidable on the same hub under the control of leaf springs which act between the hub and the discs. The brake also comprises a cylinder which is integrally formed with a suspension link and a caliper also fixed to the suspension link, the caliper having supports for friction material pads mounted thereon.

Preferably, in a disc brake according to the invention said guidance member defines a protuberance between said grooves, the protuberance being a close fit between two of the rods.

The rods are, preferably, provided by bolts.

The guidance member may be made of plastics material or metal such as aluminium. Preferably, the guidance member is formed as an extrusion, since the guidance member can be formed with a constant transverse cross-sectional shape.

THE DRAWINGS

There now follows a detailed description, to be read with reference to the accompanying drawings, of a disc brake which is illustrative of the invention.

In the drawings.

Figure 2:
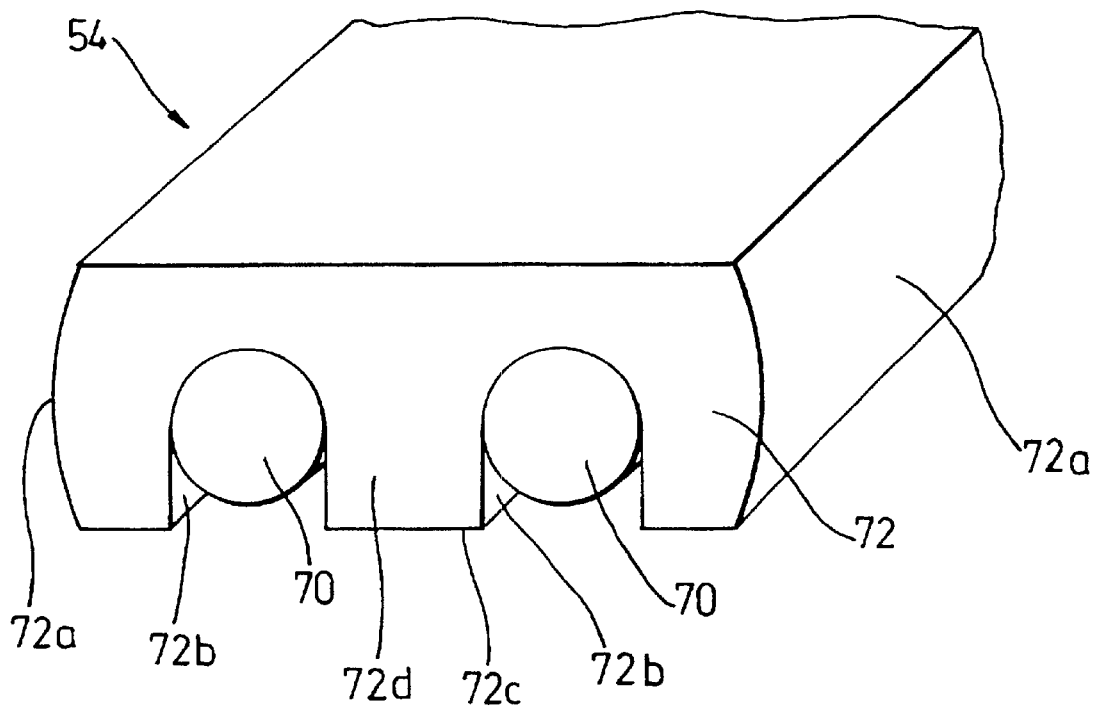

FIG. 1 is a vertical cross-sectional view taken through the illustrative disc brake; and FIG. 2 is a perspective view on an increased scale of a guidance member of a caliper of the illustrative disc brake.

DETAILED DESCRIPTION

The illustrative disc brake 10 shown in FIG. 1 is for a wheel (not shown) of a car. The brake 10 comprises a disc 12, a further disc 14, and a hub 16, on which the wheel can be mounted. The discs 12 and 14 and the hub 16 are arranged to rotate about a common central axis 18.

The hub 16 comprises an internally splined hollow inner cylindrical portion 16a which is arranged to receive a drive shaft (not shown) which drives the wheel. The hub 16 also comprises an external flange 16b at one end of the portion 16a. This flange 16b has bolt holes (not shown) through which the wheel can be bolted to the flange 16b in a conventional manner. The flange 16b also serves to connect the portion 16a to an outer hollow cylindrical portion 16d of the hub 16.

The two discs 12 and 14 are mounted on the cylindrical outer surface of the hub portion 16d so that the hub 16 and the two discs 12 and 14 rotate as a unit about the axis 18 and the discs 12 and 14 can perform axial sliding movement on said hub 16. Specifically, four grooves 20 are formed in the outer cylindrical surface of the portion 16d of the hub 16 and four teeth 22 which project inwardly from each of the discs 12 and 14. The teeth 22 enter the grooves 20 and are a sliding fit therein.

The brake 10 also comprises four friction material pads 26 which are arranged with two of the pads 26 on opposite sides of each of the discs 12 and 14. The pads 26 are for braking the discs 12 and 14 by engaging side surfaces of the discs. The friction pads 26 are secured to three backing plates 28, one backing plate 28a being between the discs 12 and 14 and the others being on opposite sides of the discs 12 and 14 to the plate 28a. The median plate 28a has friction material pads 26 secured to both of its faces. When the brake is applied, a movable outer friction material pad 26 is moved until the four pads 26 and the discs 12 and 14 are all in contact with one another, the discs 12 and 14 and the plate 28a sliding axially to accommodate this movement.

The brake 10 also comprises resilient means in the form of four leaf springs 32 mounted on the hub 16 and engaging the discs 12 and 14 so that the springs 32 apply force radially between each of the discs 12 and 14 and the hub 16. The leaf springs 32 are equally distributed circumferentially around the hub 16, each being mounted on one of the bottom surfaces of the grooves 20, ie each spring 32 is mounted in one of the grooves 20 and acts between the bottom surface of the groove and an inner surface of the teeth 22 which enter the groove 20.

The illustrative brake 10 also comprises an operating mechanism operable to bring the pads 26 into contact with the discs 12 and 14. The operating mechanism is in the form of a piston and cylinder assembly comprising a piston 50 and a cylinder 52, the cylinder 52 is fixed relative to the axis 18 being integral with a suspension link (not shown) of the vehicle as disclosed in WO 98/25804. The assembly 50, 52 is operable to move a first of the pads 26 into contact with the disc 12 and to cause relative movement between the assembly 50, 52 and the disc 12 to bring the other pad 26 associated with the disc 12 into contact with the disc 12, so that the pads 26 apply a braking force to the disc 12. Specifically, a caliper 54 is mounted on the cylinder 52 and bridges the edges of both discs 12 and 14. The furthest pad 26 from the cylinder 52 has its support plate 28 fixedly mounted on the caliper 54 while the support plates 28 of the remaining pads 26 are slidable on the caliper 54. When the piston 50 is moved outwardly from the cylinder 52 by hydraulic fluid under pressure, it directly presses the support plate 28 of the nearest pad 26 so that the plate 28 slides on the caliper 54. The nearest pad 26 presses the disc 12 so that it slides on the hub 16. The disc 12, in turn, presses on the pad 28 on the opposite side thereof causing the support plate 28a to slide on the caliper 54. The movement of the plate 28a causes the pad 26 on the plate 28a which faces the disc 14 to contact the disc 14. The disc 14 slides on the hub 16 until it contacts the pad 26 on the plate 28 which is fixed to the caliper 54. The brake 10 is now "on" with the discs 12 and 14 both engaged on both sides by one of the pads 26.

The caliper 54 comprises two rods 70 (FIG. 2) which extend parallel to one another axially of the hub 16. The rods 70 are provided by bolts which pass through holes (not shown) in the plate 28 which supports the pad 26 which is furthest from the cylinder 54. The bolts are also received in tapped holes (not shown) in the cylinder 52. Bolts of this type are disclosed in WO 98/26191. The bolts may also be arranged to extend in the opposite direction, ie the bolts pass through holes in the cylinder 52 and are received in tapped holes in the furthest plate 28. The caliper 54 also comprises a guidance member 72 which forms a slideway of the brake 10 on which the movable pads 26 are supported for sliding movement towards or away from the discs 12 and 14. Specifically, the guidance member 72 comprises oppositely-facing arcuate side surfaces 72a on which hook-like projections of the support plates 28 of the movable pads 26 are slidable.

The guidance member 72 also defines two parallel grooves 72b in a lower surface 72c thereof. The grooves 72b extend parallel to the direction of the slideway defined by the surfaces 72a and are arranged to be a close fit over the rods 70. The guidance member 72 is supported by the rods 70 which are received in said grooves 72b and is held in position between the fixed plate 28 and the cylinder 52 by clamping force applied by the bolts 70 which form the rods.

The guidance member 72 also comprises a protuberance 72d between said grooves 72b, the protuberance 72d being a close fit between said rods 70.

The guidance member 72 has a constant transverse cross-sectional shape and is formed of aluminium as an extrusion, although other materials, including plastics materials such as glass fibre re-inforced phenolic resin, could be used.

The guidance member 72 is easily assembled on the rods by fitting the grooves 72b over the rods 70.

What is claimed is:

1. A disc brake comprising a disc, friction material pads arranged on opposite sides of the disc, and an operating mechanism operable to bring the pads into contact with the disc so that the pads apply a braking force to the disc, the brake also comprising a slideway on which at least one of said pads is supported for sliding movement towards or away from the disc, wherein said slideway is formed by a guidance member which bridges the edge of the disc and defines at least two parallel grooves in a surface of the guidance member which faces the edge of the disc, the grooves extending parallel to the direction of the slideway, the guidance member being supported by parallel rods which are received in said grooves.

2. A disc brake according to claim 1, wherein said guidance member defines a protuberance between said grooves, the protuberance being a close fit between two of the rods.

3. A disc brake according to claim 1, wherein said rods are provided by bolts.

4. A disc brake according to claim 1, wherein the guidance member is made of plastics material.

5. A disc brake according to claim 1, wherein the guidance member is formed as an extrusion.

* * * * *